United States Patent Office 3,540,024
Patented Nov. 10, 1970

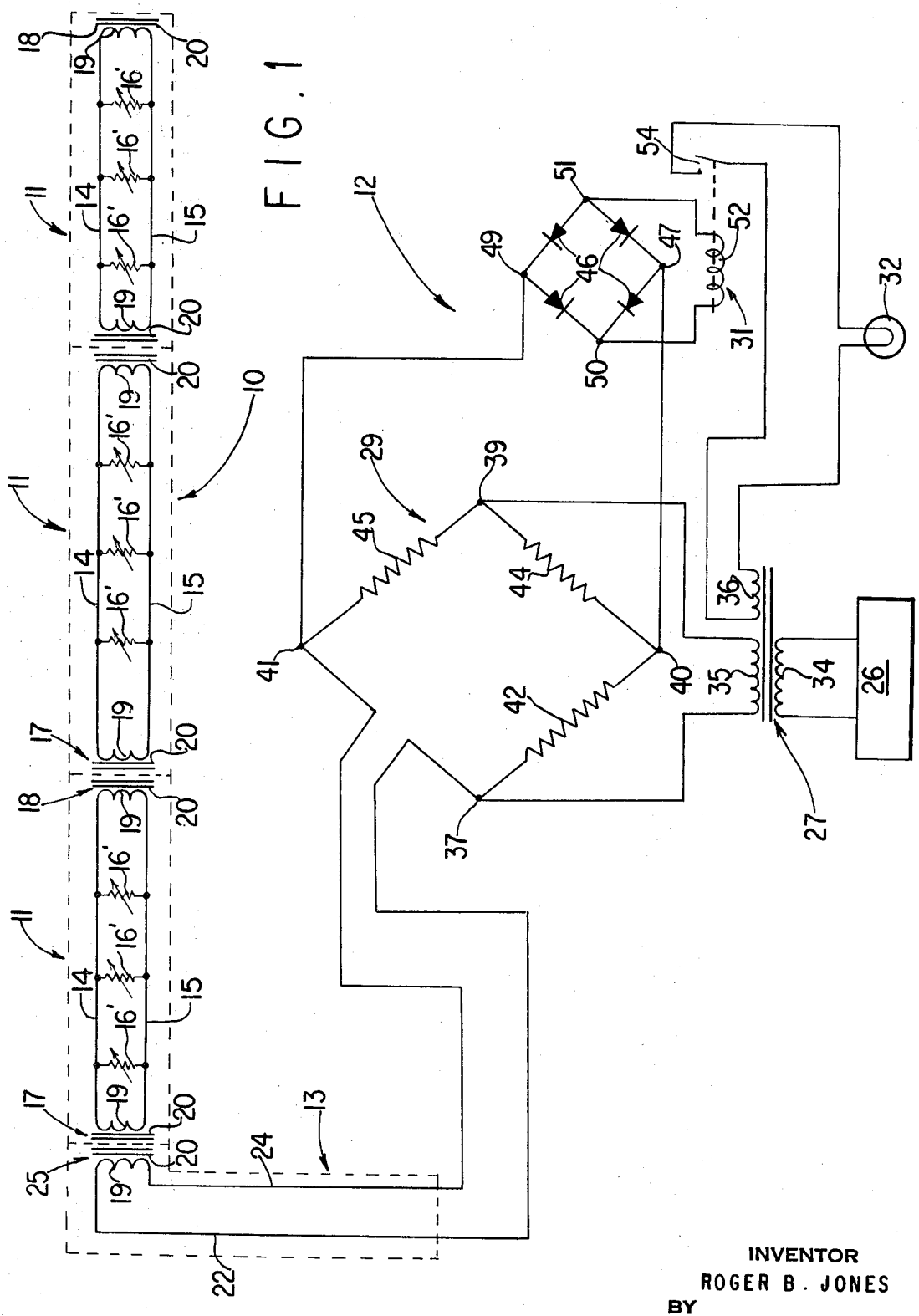

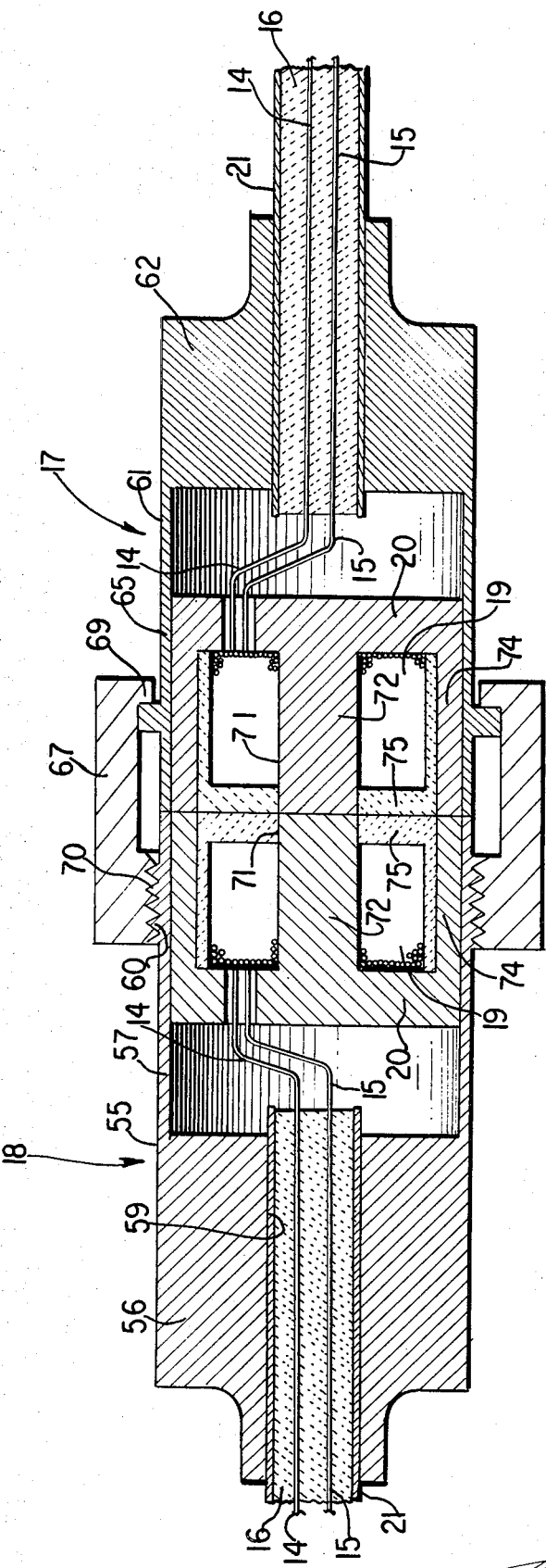

3,540,024
SYSTEM WITH INDUCTIVELY COUPLED TEMPERATURE SENSING UNITS
Roger B. Jones, North Caldwell, N.J., assignor to Walter Kidde & Company, Inc., Belleville, N.J., a corporation of Delaware
Filed Sept. 24, 1968, Ser. No. 762,115
Int. Cl. G08b *17/00*
U.S. Cl. 340—228          6 Claims

ABSTRACT OF THE DISCLOSURE

A temperature sensing system including a thermistor element composed of inductively coupled sections joined end to end, and a circuit connected to one end of the element for detecting a change in the resistance of the thermistor material by monitoring the impedance reflected back to the circuit through the inductive couplings.

BACKGROUND OF THE INVENTION

Field of the invention

The present invention relates to apparatus for detecting abnormal temperature conditions, and, more particularly, to an arrangement which eliminates the effects of the presence of moisture in the connecting device joining sensing element sections.

The present invention, although useful for many purposes, is primarily concerned with utilizing an elongated heat detecting element comprising two conductors within a metallic sheath and spaced apart by a thermistor material which has a negative temperature coefficient of resistivity and decreases in resistance to a predetermined value in the presence of a temperature condition to be detected. Circuitry is provided for monitoring the resistance present between the wires and for giving an alarm when this resistance drops to the predetermined value.

These detecting elements are normally made in sections to facilitate installation, particularly in cramped locations, through bulkheads, etc.

Description of the prior art

In the elements currently in use, each section is sealed at the ends to prevent atmospheric moisture from gaining access to the thermistor material separating the conductors. However, the ends of the conductors are connected to electrical contacts which pass through the seals and are part of connector members formed on the ends of the section. These electrical contacts mate with the contacts in the connector members of the adjoining element sections. The mating connector members are held together by a threaded member. This arrangement is shown in detail in U.S. Pat. 3,150,311.

It has been found that the connector formed by the adjoining of two mating connector members cannot be maintained air tight, and, therefore, moisture present in the atmosphere enters the connectors and contaminates the contacts and the inner surfaces of the connectors to provide current paths between the contacts in parallel with the thermistor material between the conductors. Such current paths are frequently of very low resistance and therefore are capable of causing the resistance monitoring circuitry to give a false indication that the predetermined temperature condition exists. The presence of moisture within the connectors also causes electrolytic corrosion of the contacts.

In the systems previously in use, attempts have been made to minimize the low resistance effect of moisture in the connectors by decreasing the resistance of the thermistor material at the predetermined temperature, in order to make this value lower than the resistance of the moisture current path, and also by increasing the resistance of the moisture current path, for example, by using a direct current potential to polarize the conductive solution. Although these approaches tend to reduce the resistance effect of moisture they do not eliminate it, and they have no effect at all upon the electrolytic corrosion.

SUMMARY

An object of the present invention is to provide an improved temperature detecting apparatus not affected by the presence of moisture in its element connectors.

Another object is to provide such apparatus in which the detecting element sections have no electrical contacts subject to being bridged by moisture.

Another object is to provide such apparatus in which the detecting element sections are inductively coupled.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a temperature detecting system including first and second elongated elements each having first and second ends and comprising a pair of parallel spaced electrical conductors extending between the ends, at least the second element also including a mass of material between and in electrical contact with the conductors thereof, the material having an electrical resistance which changes in value in response to temperature changes to alter the resistance between the conductors, means for holding the first end of the second section closely adjacent to the second end of the first section, means in the first end of the second section and in the second end of the first section for inductively coupling the conductors in the first section to the conductors in the second section, a source of varying potential electrical power coupled to the first end of the first section to be transmitted through the inductive coupling means into the second section, means for detecting a change in the resistance of the material by monitoring the impedance appearing at a first end of the first section, and means for giving an indication when the impedance reaches a predetermined value.

BRIEF DESCRIPTION OF THE DRAWINGS

A preferred embodiment of the invention has been chosen for the purpose of illustration and description, and is shown in the accompanying drawings, forming a part of the specification, wherein:

FIG. 1 is a schematic diagram of the system of the present invention wherein the thermistor material between the conductors is represented by a number of parallel variable resistances.

FIG. 2 is a longitudinal sectional view of a portion of a detecting element showing the construction of the connector inductively coupling the element sections.

DESCRIPTION OF THE PREFERRED EMBODIMENTS

Referring to FIG. 1 of the drawings in detail there is shown, in schematic form, a fire detecting system according to the present invention which includes a fire detecting element 10 comprising a plurality of sections 11 positioned end to end, a circuit 12 for monitoring the condition of the element 10, and a cable 13 for interconnecting the element 10 with the circuit 12.

Each of the detecting element sections 11 as shown in FIGS. 1 and 2 include a pair of parallel conductors 14 and 15 embedded in a mass 16 (FIG. 2) of material having a negative coefficient of resistance, represented by the variable resistances 16' in FIG. 1. Transformer assemblies 17 and 18 are positioned at opposite ends of each of the element sections 11. Each of these assemblies include one-half of a transformer having a winding 19 electrically connected across the ends of the conductors 15 and 16, and a section 20 of a transformer core. As shown in FIG. 2, each of the sections 11 is provided with a metal sheath 21 which extends the full length of the section.

The cable 13 includes a pair of conductors 22 and 24 embedded in an insulating ceramic material and in electrical connection with a transformer assembly 25 provided on the end of the cable connected to the element 10. The assembly 25 is identical to the assemblies 18 of the element sections 11 described in detail hereinafter and includes a winding 19 and a core section 20.

The circuit 12 includes a source of alternating current power 26, a transformer 27, an impedance measuring bridge 29, a full wave rectifying bridge 30, a relay 31, and an indicator light 32.

The transformer 27 has an input winding 34 connected to the source and a pair of output windings 35 and 36. The impedance measuring bridge 29 has a pair of input terminals 37, 39 connected to the transformer winding 35, a pair of output terminals 40, 41 connected to the rectifying bridge 30, an impedance device 42 connected between the terminals 37 and 40, an impedance device 44 connected between the terminals 40 and 39, and an impedance device 45 connected between the terminals 39 and 41. The conductors 22 and 24 are connected to the terminals 37 and 41 respectively to make the impedance of the element 10 the fourth leg of the impedance measuring bridge.

The rectifying bridge 30 includes four diodes 46 arranged in conventional manner between a pair of input terminals 47 and 49, which are connected to the output terminals 40 and 41 of the bridge 29, and a pair of output terminals 50 and 51.

The relay 31 includes a winding 52 connected between the terminals 50 and 51 of the bridge 30, and a pair of contacts 54 under the control of the winding 52 and connected in series with the light 32 across the winding 36 of the transformer.

The assembly 18 includes a connector element 55 having a cylindrical base section 56 and a tubular section 57. The base section 56 is provided with a bore 59 into which the end of the element section 11 is fitted. The section 56 is then welded or otherwise bonded to the sheath 21 so as to provide a water and gas tight connection.

The tubular section 57 houses the transformer core section 20 and the winding 19 and is provided with threads 60 on the outer surface thereof.

The assembly 17 includes a similar connector element 61 having a cylindrical base section 62 provided with a bore 64 for receiving the end of the element section and having a tubular section 65 for housing the transformer core section 20 and winding 19. The outer surface of the tubular section 65 is provided with a shoulder 66 and an annular nut 67 having a flange 69 engaging the shoulder 66 and having internal threads 70 for engaging the threads 60 on the assembly 18.

The core sections 20 are cylindrical members of ferro magnetic metal in which an annular recess 71 has been provided to form an inner cylindrical pole piece 72 and an outer pole piece 74. The winding 19 is wound across the pole piece 72 and the remainder of the recess 71 is filled with a mass 75 of an insulating material such as epoxy resin to form a flat and completely sealed end surface.

In operation, the element sections 11 are joined together by threading the annular nuts 67 of the assemblies 17 onto the threads 60 of the assemblies 18. The pole pieces 72 and 74 of the mating assemblies 17 and 18 are thereby pressed against each other as shown in FIG. 2 to form complete transformers interconnecting the sections 11. In the like manner, the assembly 25 of the cable 13 is connected to the assembly 17 on the end of the element 10.

Alternating current flows from the coil 35 of the transformer 27 through the bridge 29 between the input terminals 37 and 39.

The element 10 presents an impedance between the terminals 37 and 41 which is proportional to the current drawn by the winding 19 of the transformer half within the assembly 25. When the element 10 is at normal ambient temperatures, the material 16 has a high resistance and the current which flows through the wires 24 and 25 of the cable 13 is that required to maintain the magnetic fields within the transformers assemblies. The impedance devices 42, 44, and 45 have impedance values proportional to each other and to the normal impedance between the terminals 37 and 41 such that no current flows between the output terminals 40 and 41 when the element 10 is at normal ambient temperatures.

When any portion of one of the element sections 11 is exposed to the abnormal temperature of a fire, the material 16 in that portion of the section decreases sharply in resistance and provides a second current path. The current flowing into that section 11 from the winding 19 in the assembly 17 now divides, part of it flowing through the material 16 at the hot spot and part flowing to the winding 19 in the assembly 18 at the other end of the section. The second current path draws additional current from the winding in the assembly 17 and this additional demand is transferred back through the transformer couplings to the winding in the assembly 25. Thus, the impedance present between the terminals 37 and 41 decreases and the bridge 29 is unbalanced. Current now flows between the terminals 40 and 41 through the rectifying bridge 30 and the relay winding 52. The relay 31 is energized closing the contacts 54 and lighting the lamp 32.

From the foregoing, it will be seen that the present invention provides an improved temperature detecting apparatus in which the detecting element sections are inductively coupled so as to eliminate from the element section connectors all electrical contacts which could be bridged or corroded by moisture within the connector. All false alarms due to contamination of the connectors are thereby eliminated.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

What is claimed is:

1. A temperature detecting system including first and second elongated elements each having first and second ends and comprising a pair of parallel spaced electrical conductors extending between said ends, at least said second element also including a mass of material between and in electrical contact with the conductors thereof, said material having an electrical resistance which changes in value in response to temperature change to alter the resistance between the conductors, means for holding the first end of said second section closely adjacent to the second end of said first section, means in said first end of said second section and in said second end of said first section for inductively coupling the conductors in said first section to the conductors in said second section, a source of varying potential electrical power coupled to said first end of said first section to be transmitted through said inductive coupling means into said second section, means for detecting a change in the resistance of said material by monitoring the impedance appearing at said first end of said first section, and means for giving an indication when said impedance reaches a predetermined value.

2. A system according to claim 1, wherein said inductive coupling means in said first end of said second element section includes a half of a transformer having a winding connected across the pair of conductors therein, said inductive coupling means in said second end of said first section includes a half of a transformer having a winding connected across the pair of conductors therein, and wherein said holding means positions said transformer halves to provide magnetic coupling therebetween.

3. A system according to claim 2, wherein an inductive coupling means is provided in said second end of said second element section and includes a half of a transformer having a winding connected across the pair of conductors therein.

4. A system according to claim 2 wherein said transformer halves each include a transformer core section, each of said windings are wound on said core section, and said core sections are placed in abutting relationship by said holding means to form a complete transformer.

5. A temperature detecting system including first and successive detecting element sections each having first and second ends and being positioned in sequence so that the second end of each section is adjacent to the first end of the succeeding element section, each of said sections comprising a pair of parallel spaced electrical conductors extending between said ends thereof and a mass of material between and in electrical contact with the conductors thereof, said material having an electrical resistance which changes in value in response to temperature changes to alter the resistance between the conductors, a source of varying potential electrical power coupled to the first end of said first element section to impress said potential across the conductors of said first section, means for providing a portion of a transformer in each of adjacent ends of consecutive element sections, said transformer portions in adjacent ends cooperating to provide inductive coupling between consecutive sections for impressing said potential across the conductors of said successive sections and means for detecting a decrease in resistance of said material in any of said sections by monitoring the impedance appearing at said first end of said first section.

6. A system according to claim 5, wherein each end of each of said sections is provided with a half of a transformer including a winding connected across the pair of conductors in the section.

References Cited
UNITED STATES PATENTS 2,802,924   8/1957   Hebenstreit _____ 338—26

ROBERT L. RICHARDSON, Primary Examiner

U.S. Cl. X.R.

323—69; 338—26